3,012,000
PROCESS OF MAKING A GRAFT COPOLYMER OF BUTADIENE AND STYRENE-ALLYL METHACRYLATE COPOLYMER
Robert S. Aries, 270 Park Ave., New York 17, N.Y.
No Drawing. Filed June 5, 1956, Ser. No. 589,385
1 Claim. (Cl. 260—45.5)

The present invention relates to novel copolymers and the processes for their preparation. More particularly, it relates to novel copolymers of ethylenically unsaturated materials, which copolymes exhibit markedly different properties from known copolymers even when formed from the same monomers.

In copolymerizing a mixture of ethylenically unsaturated monomers to form an essentially linear chain, the individual monomeric units of each component may be distributed at random, occasionally attached to two monomeric units of the other component or to two identical monomeric units. Where several monomeric units of one of the components make up a comparatively long segment and such segments are united into a single linear chain, the copolymer is called a "block copolymer." Occasionally, one of the components will form a linear chain or backbone and the other component, in segments varying from one to several monomeric units, will be attached as branches of the chain. This latter type of copolymer is referred to as a "graft copolymer."

The individual segments of the copolymer carry with them the essential properties of the polymer which they represent and consequently the properties of a given block or graft copolymer are essentially a superposition of the properties of two component polymeric segments. For instance, a graft copolymer of styrene and vinyl alcohol is soluble in water as well as in benzene, whereas polyvinyl alcohol is soluble only in water, polystyrene is soluble only in benzene and a "normal" copolymer neither in water nor in benzene but in solvents of intermediate polarity such as acetone or dioxane.

Thus cold GR-S, a copolymer of butadiene and styrene in which the styrene units are either single or in pairs and are separated from each other by stretches of 6–12 butadiene units, has certain of the rubbery properties characteristic of butadiene polymers. In this copolymer, about 15% of the butadiene molecules are in 1,2-addition and about 85% in 1,4-addition; the double bonds of the 1,4-monomers are about 70% in the trans- and 30% in the cis-configuration. Thus the diene segments of this copolymer which are responsible for the rubberiness of the total material have a rather random structure, which is apparently responsible for the deficiencies of this product in comparison with natural rubber.

It is accordingly an object of the present invention to produce a novel copolymer wherein portions of the polymer molecule are stereospecific rather than random.

It is a further object of the invention to produce novel block and graft copolymers of ethylenically unsaturated monomers and dienes or diolefins which copolymers are characterized by stereospecificity and substantially uniform configuration within the segments made up of polymerized molecules of one of the components.

These objects and advantages are realized in accordance with the present invention wherein copolymers are prepared having segments characterized by a regularity of structure which imparts thereto physical properties not heretofore possible in synthetic copolymers.

The novel copolymers can be prepared in a variety of ways. For example, one of the components is polymerized under conditions such that a stereospecific and isotactic material results, i.e., through use of metal alkyls possibly with promoters, through use of freshly prepared titanium sub-halides, Alfin catalysts, etc. The polymer can then be subdivided if the chain length is too long or the polymeric molecules can be used directly and united to the other component of the copolymer. These segments can be formed into a block copolymer by joining the ends of sucessive segments to the other component whether present as a monomeric molecule or whether present as a polymeric segment. In the latter case, the resulting copolymer molecule will be characterized by alternate polymeric segments of the individual monomers. Alternately, the other component can be polymerized to form a chain to which the pre-formed polymeric segments of the first component are attached, to produce a graft copolymer.

In the case of block copolymers, the polymerization of the first component can be effected in the same vessel wherein these segments are joined to the other component. The polymeric segments will be formed and will be joined into a linear chain by either single molecules of the other component or by polymeric segments of the second component. Alternatively, polymeric segments of each may first be formed and the ends converted into reactive groups which may be joined directly or by a linking agent, e.g., longer polymers than desired are oxidized to form shorter polymeric segments each terminating in carboxyl groups and the several segments linked into a chain by a bifunctional reagent such as a diamine.

In forming graft copolymers, the second component is first formed into a linear chain in known manner. By way of example, an ethylenically unsaturated monomer such as styrene is polymerized for this purpose. To provide centers to which the branches may be attached, however, a small amount of a material containing two ethylenic unsaturations is incorporated, e.g., a lower alkenyl ester of a lower alkenoic acid such as allyl methacrylate. One of these unsaturations will be utilized in continuing the chain of styrene while the other unsaturation will branch off from the chain and will serve as an anchor for a segment of the other component such as butadiene. The butadiene can be attached as a pre-formed polymeric segment or monomeric butadiene can be employed and the polymeric segment will grow from the anchor. The nature of the catalyst and conditions of the polymerization will determine the type of growth of the butadiene.

The novel copolymers will possess certain properties not present in homopolymers of either of the components and will be characterized by much greater physical strength than heretofore known copolymers made up of the same amounts of the same monomers. Compared with the GR-S copolymer referred to hereinabove, a novel copolymer of the same chemical constitution is found to be far more rubbery and capable of withstanding far greater impact forces.

The novel copolymers are formed of monomers of an ethylenically unsaturated compound, i.e. ethylene or a substitution product thereof, and a diene or diolefin. Suitable ethylenically unsaturated monomers include ethylene, propylene, butylene, vinyl chloride, vinyl acetate, vinyl cyanide (acrylonitrile), vinyl benzene (styrene), and the like. The dienes can be hydrocarbons or may contain non-interfering substituents such as halogens, hydroxy, intermediate ethereal oxygen atoms, and the like. Preferably, however, conjugated diolefins are employed such as butadiene and isoprene. The dienes will add either in 1,2 or 1,4 manner, either cis- or trans-, depending upon the prevailing conditions. The remaining unsaturations in the finished copolymer can be cross-linked or vulcanized in conventional manner depending upon the type of end product desired.

The following examples illustrate the preparation of several novel copolymers in accordance with the present invention:

Example I (a) 7.8 grams of butadiene and 2.2 grams of styrene are dissolved in 100 ml. of cyclohexane at 45° C. To this solution there is added 0.12 gram of lithium metal in the form of a fine dispersion in 30 ml. of paraffin oil and the system is vigorously stirred with complete exclusion of air and moisture. After 10–15 minutes the Li-beads begin to show a thin slightly yellow coating which deepens in color as the reaction proceeds. The solution itself thickens in the course of 2–3 hours, at which time most of the monomers are converted to a copolymer, which remains dissolved in the liquid phase. In order to facilitate the filtration of the lithium beads, 50 ml. of cyclohexane are added and the dark gelatinous mass of the catalyst is separated by filtration through a fritted glass filter with gentle suction. To the filtrate 20 ml. of 0.1 N HCl are added and by gentle shaking the remnants of the metal catalyst are destroyed. The aqueous phase is then removed in a separatory funnel and a clear solution of about 9.6 grams of the copolymer in about 180 ml. liquid is obtained. The reaction product is recovered by precipitating it out of solution with methanol. (The product can also be recovered by evaporating the solvent mixture.) The product is a rubbery material having an osmotic molecular weight of 130,000–160,000, and an intrinsic viscosity of 1.25–1.45. Thin films cast from a solution in benzene containing a small amount of $SCl_2$ and cured by heating to 60° C. for 20 minutes give an infrared absorption spectrum indicating that at least 95% of all butadiene units are present as the 1,4-addition form and in the cis-configuration; the styrene units appear to be either isolated or in pairs. The films can be stretched up to 600% and maintain the stress for a long time; they show a few diffraction points of a fiber diagram having an identity period along the direction of stretch similar to that of natural rubber. This confirms that the butadiene units are essentially in the cis-configuration.

(b) A larger quantity of the copolymer prepared in (a) is compounded as follows and then cured at 140° C. for 20 minutes.

| Ingredient: | Parts by weight |
|---|---|
| Copolymer of (a) | 100 |
| EPC black | 50 |
| Para-Flux asphaltic oil plasticizer | 6 |
| ZnO | 3 |
| Sulfur | 2.8 |
| Mercaptobenzothiazole | 0.9 |

Normal GR–S and Hevea are compounded by the same recipe and the three vulcanizates tested. The results are as follows:

|  | Hevea | GR–S | Copolymer of (a) |
|---|---|---|---|
| P.s.i., Tensile strength at: | | | |
| 25° C | 4,000 | 2,800 | 3,700 |
| 85° C | 3,200 | 1,250 | 3,150 |
| Percent Elongation at: | | | |
| 25° C | 660 | 650 | 670 |
| 85° C | 690 | 510 | 630 |
| Percent Rebound at: | | | |
| 25° C | 70.5 | 55.0 | 68.2 |
| 85° C | 82.0 | 67.2 | 79.5 |

This shows that the novel copolymer, differing from GR–S solely in structure, has properties which are far superior to normal GR–S and approach even those of the best natural rubber.

Example II (a) A solution of 10 millimols of $TiCl_4$ in 30 ml. of heptane are added to a solution of 50 millimols of triallyl-aluminum in 30 ml. of heptane at room temperature under stirring in the complete absence of oxygen and moisture. A black precipitate forms and is kept in suspension by continued stirring. A solution of 50 grams of monostyrene and 0.38 gram of butadiene in 30 ml. of heptane are added and the temperature raised to 50° C. After two hours all monomers react and the copolymer is precipitated by the addition of methanol. Infrared investigation and determination of aliphatic unsaturation discloses that the product contains one butadiene for 86 styrene units. The total average degree of polymerization is around 3000. Films are cast, properly annealed, oriented by stretching and investigated with X-rays; the diagrams obtained show that the styrene segments possess an isotactic arrangement.

(b) The polymer produced in (a) is dissolved to a 5% solution in benzene and treated with ozone at room temperature. The viscosity of the solution is reduced rapidly during this treatment, which lasts only for a few minutes and a low molecular weight polymeric product is obtained by the evaporation of the solvent, after all the ozone is reduced and all oxygen eliminated. Analysis of these polymeric product blocks reveals that the number average degree of polymerization is between 80 and 90 and that each molecule contains an average of 1.8 carboxyl groups.

(c) All 1,4-trans-polybutadiene blocks with an average DP of about 10 and with carboxyl groups at all chain ends are prepared by an initial polymerization with an Alfin catalyst, followed by the partial ozonization of the polybutadiene. The material obtained in this manner is a soft waxy, slightly rubbery mass.

(d) 10.4 grams of the product of (b) and 1.1 grams of the product of (c) are dissolved in xylene, and 0.1 gram of ethylenediamine dissolved in xylene is slowly added while the solution is stirred and kept at a temperature of 110° C. As the polycondensation reaction proceeds, water evaporates and the viscosity of the system increases. After about 1½ hours it is necessary to add more xylene in order to keep the viscosity of the mixture sufficiently low to permit stirring and continued azeotropic removal of the water. After 3 hours the reaction is interrupted, the solution cooled down to room temperature and methanol employed to precipitate a white, cheesy mass. The mass is filtered off, washed with methanolic HCl, water and again with methanol and dried in a vacuum oven at 60° C. The resulting polymer is a snow white powder easily soluble in benzene and having the following characteristics—

Number average molecular weight _____ 165,000 (osmotic).
Weight average molecular weight _____ 420,000 (light scattering).

The X-ray diagram of oriented films of the product shows the pattern of isotactic polystyrene with a melting point of 212° C. (disappearance of X-ray reflections). The infrared absorption spectrum reveals the presence of —CO—NH— bonds and of aliphatic double bonds in the transconfiguration. There are $1.2 \times 10^{-2}$ —CO—NH bonds and $1.3 \times 10^{-1}$ aliphatic double bond per monostyrene unit. The second order transition point of this block copolymer, obtained by the Volume-Temperature curve, is found to be at −28° C. Fibers are spun from the melt at 235° C. and drawn at 160° C. to a 5.15:1.0 draw ratio. Their tensile strength at room temperature is 7.2 grams per denier and their elongation to break is 25.3%. Films are cast from the melt and from solutions in benzene and flex tests are made in comparison with films of polystyrene having the same thickness (2.6 mils). The resistance against failure of this block copolymer is 19–25 times as high as that of standard polystyrene. Test pieces are molded and impact strength measurements made with the block copolymer by the standard notched Izod method. The results are as follows.

| Material: | Impact strength in ft. lb./inch |
|---|---|
| (a) Commercial polystyrene | 0.25–0.35 |
| (b) Commercial polystyrene | 0.95–1.05 |
| Product of (d) | 4.6–8.5 |

Heat distortion point determinations made with the block copolymer give values between 95 and 106° C.

A series of curing experiments carried out with films of the block copolymer show that the normal processing ingredients such as carbon-black or other reinforcing fillers, sulfur or other vulcanizing agents, accelerators, stabilizers, softeners, extenders and lubricants can easily be incorporated into the material by standard mixing and blending methods and that a wide range of degrees of vulcanization can be reached by curing in the temperature range between 135°–165° C. The resulting products are completely insoluble in any solvents, have a higher modulus than the uncured samples and represent rigid, tough plastics of high tensile-, bending, and impact strength.

*Example III*

The synthesis of a graft copolymer of polystyrene possessing a few, relatively short branches of a low molecular weight 1,3-polybutadiene can be carried out in the following manner:

(*a*) 10.4 grams of styrene monomer are dissolved together with 1.1 gram of allyl methacrylate in 100 ml. of benzene, and 0.22 gram bis-azo-isobutyronitrile is added. The system is kept at 70° C. in a sealed tube under mild agitation for 12 hours. Then the tube is opened, the contents transferred to a separatory funnel and 100 ml. of methanol added. There is precipitated a white, fluffy polymeric material which is filtered off, washed repeatedly with methanol and finally dried in a vacuum oven at 50° C. for 6 hours. The dry polymer weighs 9.8 grams, has a number average molecular weight of 140,000 and a weight average molecular weight of 350,000.

(*b*) 8.0 grams of the polymer obtained in (*a*) are dissolved in 100 ml. of tetralin and transferred to a thick walled glass tube which is capable of being sealed, and placed on a shaking machine. 3 grams of butadiene and 1.5 grams of $NaAlH_4$ are added to the solution, the tube sealed and gently agitated at 80° C. for 12 hours. The tube is then cooled to 0° C. and opened. The unreacted butadiene escapes and the contents of the tube are placed in a separatory funnel. Upon addition of 100 ml. of methanol there is precipitated a white, gelatinous mass which is separated and repeatedly washed with cold methanol. It is readily soluble in benzene, toluene, methylethylketone and mixtures of these solvents with acetone, hexane and ethanol. The yield of copolymer is 10.1 grams and its structure is established in the following manner:

(1) It is impossible by extraction with methanol, acetone or hexane to separate any purely aliphatic material of the type of a polybutadiene from the bulk of the polymer.

(2) Infrared spectra of thin films reveals clearly the presence of aromatic rings and of vinyl-double bonds.

(3) Oxidation of the double bonds according to Lee et al., J. Polymer Science, vol. 3 (1948), pp. 66–84; leads to the liberation of acid which can be titrated to permit the quantitative establishment of the number of pendant vinyl groups. Oxidation also produces carboxyl groups on the polymer molecule, which can also be titrated to provide a check on the results of the acid determination.

(4) The polymer is fractionated from methylethylketone solution with methanol into 10 fractions having intrinsic viscosities ranging from 2.3 down to 0.16 but showing essentially the same infrared absorption spectrum regarding the relative content of aliphatic and aromatic material. This proves that the fractionation has taken place according to molecular weight rather than according to chemical composition.

(5) On treating the graft copolymer with sodium methylate in methylethylketone at 70° C. for 2 hours, the ester linkages of the allyl methacrylate molecules are hydrolyzed and the branches split off. After this treatment it is easy to extract with hexane about 2.2 grams of a waxy material having molecular weight of about 20,000 and displaying the characteristic X-ray diagram of syndiotactic polybutadiene. Oxidation according to Kolthoff and Lee yields acid and a water-soluble polycarboxylic acid having an intrinsic viscosity of 0.18. The hexane-insoluble part (about 7.8 grams) is a random copolymer of styrene and methacrylic acid having a molecular weight of about 150,000.

(*c*) These experiments prove that the material obtained during the copolymerization reaction is a true graft copolymer of styrene-allyl methacrylate copolymer and 1,3-butadiene wherein the butadiene has been polymerized by 1,2 addition, with the polybutadiene branches in their syndiotactic configuration. Films cast of this material are colorless and transparent, with a softening point around 70° C. and an impact strength around 0.6–0.7 ft. lb./inch at room temperature. This material is rapidly cross-linked by the action of peroxides at 70–80° C. and is converted by the cross-linking to a colorless, transparent, hard, insoluble and infusible mass with impact strength values between 4 and 5 ft. lb./inch. The cured, thermoset resin is completely resistant to the action of solvents and swelling agents.

(*d*) The new graft copolymer can also be added as a cross-linking agent to normal polystyrene in relatively small quantities and improves its impact strength to a substantial degree. 5 grams of the product of (*b*) and 0.05 gram of benzoyl peroxide are added to 45 grams of Lustrex (standard polystyrene having an impact strength of 0.3–0.4 ft. lb./inch) and cured for a short time at 80° C. There is obtained an insoluble and infusible resin with an impact strength between 1.2 and 1.4 ft. lb./inch. The material still swells in aromatic liquids but does not actually dissolve in them.

*Example IV*

(*a*) Propylene is polymerized at 90° C. according to the method of Natta and Ziegler using $TiCl_4$ and triallylaluminum in tetralin as catalysts. There is obtained isotactic polypropylene having an intrinsic viscosity of 0.12, corresponding to a number average molecular weight of about 8,000–10,000. The infrared absorption diagram shows that there are still a few aliphatic double bonds left in the system, which is substantiated by the fact that it reacts with iodine chloride additively and that carbonyl groups are produced by oxidation. Titration of these carbonyl groups together with the osmotically determined number average molecular weight indicates that there are on the average 2.2 carbonyl groups per molecule of the isotactic polypropylene.

(*b*) Butadiene is polymerized in benzene solution with Li metal and Li-ethyl as catalysts according to the Firestone process at 80° C. under vigorous stirring. The viscous solution containing the polymer is separated from the solid catalyst, $CO_2$ is passed through at 60° C. for 2 hours and the reaction product is extracted with water. There is obtained a soft, colorless rubbery mass, easily soluble in most organic solvents, and having an intrinsic viscosity of about 0.1. Films are cast and their infrared analysis demonstrates that this material is a low molecular weight (about 8,000) 1,4-cis-polybutadiene with about 1.8 carboxyl groups per macromolecule. The presence of carboxyl groups is also indicated by titration, the cis-configuration of the polymer is also confirmed by obtaining X-ray diagrams from stretched films of this material.

(*c*) A solution in 20 ml. of xylene of 2.4 grams of the carbonyl-containing polypropylene produced in (*a*) and a solution in 20 ml. of xylene of 3.4 grams of the carboxyl-containing polybutadiene produced in (*b*) are mixed and 0.25 gram of ethylene diamine are added. The system is then heated with stirring at 110° C. so that water can escape but the solvent is retained. As the reaction proceeds the viscosity of the system increases and after 3 hours the contents of the flask can be stirred only with difficulty. The reaction is terminated and 200 ml. of benzene added to dilute the system. A white, cheesy mass is precipitated by the addition of methanol, is separated from the liquid phase, and dried in vacuo.

(d) The infrared absorption spectrum of films of this material establishes the presence of aliphatic double bonds in the cis-configuration, of methyl groups, and of

—CO—NH— groups, the relative frequency being about $1:1:5\times 10^{-3}$. The number average molecular weight of this polymer is about 200,000. The material is a tough, rigid, colorless, transparent plastic with a softening point of about 100° C. Above this temperature it becomes rubbery and is a resilient and snappy rubber which can be cured by the standard method of rubber processing.

Linking components other than those shown in the examples can also be employed. In forming block copolymers of segments terminating in carboxyl groups, a diepoxide such as butadiene diepoxide could be used for linkage through ester groups. Diketene forms a linkage through acid anhydride groups which are quite stable. In forming the chain of a graft copolymer, the units through which the branches are attached can be any monomer containing two ethylenic unsaturations of non-equal reactivity such as vinyl allyl ether so that the more reactive group will enter the chain and the less reactive group will be available for joinder.

Various changes and modifications may be made without departing from the spirit and scope of the present invention and it is intended that such obvious changes and modifications be embraced by the annexed claim.

What is claimed is:

The process of preparing a graft copolymer of butadiene and styrene-allyl methacrylate polymeric material, which comprises the steps of heating a mixture of styrene and allyl methacrylate in a 10:1 molar ratio respectively at about 70° C. in benzene in presence of bis-azo-isobutyronitrile to obtain a polymeric material, precipitating said polymeric material, dissolving said polymeric material in tetralin, adding butadiene, heating at a temperature of about 80° C. in presence of sodium-aluminum hydride catalyst, and recovering the resulting copolymer.

References Cited in the file of this patent

UNITED STATES PATENTS

| 1,073,116 | Harries | Sept. 16, 1913 |
| 1,938,731 | Tschunkur et al. | Dec. 12, 1933 |
| 2,317,859 | Soday | Apr. 27, 1943 |
| 2,460,300 | LeFevre et al. | Feb. 1, 1949 |
| 2,506,857 | Crouch | May 9, 1950 |
| 2,606,179 | Boyd | Aug. 5, 1952 |
| 2,643,987 | Harrison et al. | June 30, 1953 |
| 2,692,255 | Kreider | Oct. 19, 1954 |
| 2,762,790 | Greene | Sept. 11, 1956 |
| 2,797,208 | Burke | June 25, 1957 |
| 2,832,759 | Nowlin et al. | Apr. 29, 1958 |
| 2,845,467 | Mertzweiller | July 29, 1958 |
| 2,849,432 | Kibler et al. | Aug. 26, 1958 |
| 2,856,391 | Diem | Oct. 14, 1958 |

OTHER REFERENCES

Morton: "Ind. Eng. Chem.," volume 42, pages 1488–1496, August 1950.

Natta: "Jour. Polymer Science," volume XVI, pages 143–154, April 1955.

Wood: "Jour. Applied Physics," volume 25, pages 851–854, July 1954.

Stewart et al.: "Ind. Eng. Chem.," volume 45, pages 173–182, January 1953.

Natta: "Die Makromolekulare Chemie," Bd. XVI, pages 213–237, October 1955.